US006764220B2

(12) United States Patent
Griffiths et al.

(10) Patent No.: US 6,764,220 B2
(45) Date of Patent: Jul. 20, 2004

(54) ASSEMBLY FOR USE IN CONNECTING OPTICAL FIBERS

(75) Inventors: Ian James Griffiths, Newport (GB); John Kerry, Ipswich (GB); Malcolm Owen Jones, Chepstow (GB)

(73) Assignee: Pirelli General PLC, London (GB)

( * ) Notice: Subject to any disclaimer, the term of this patent is extended or adjusted under 35 U.S.C. 154(b) by 15 days.

(21) Appl. No.: 10/162,766

(22) Filed: Jun. 6, 2002

(65) Prior Publication Data

US 2002/0186953 A1 Dec. 12, 2002

(30) Foreign Application Priority Data

Jun. 8, 2001 (EP) .......................................... 01305038

(51) Int. Cl.[7] .................................................. G02B 6/36
(52) U.S. Cl. ......................................... 385/53; 385/135
(58) Field of Search .......................... 385/53, 134, 135, 385/147

(56) References Cited

U.S. PATENT DOCUMENTS

| | | | | | |
|---|---|---|---|---|---|
| 4,374,596 | A | | 2/1983 | Schlemmer et al. | 285/305 |
| 5,125,060 | A | | 6/1992 | Edmundson | 385/100 |
| 5,142,606 | A | * | 8/1992 | Carney et al. | 385/134 |
| 5,249,252 | A | * | 9/1993 | Noto | 385/135 |
| 5,511,144 | A | * | 4/1996 | Hawkins et al. | 385/135 |
| 5,513,293 | A | * | 4/1996 | Holland et al. | 385/134 |
| 5,737,475 | A | * | 4/1998 | Regester | 385/134 |
| 5,754,723 | A | * | 5/1998 | Fremgen | 385/135 |
| 5,764,843 | A | | 6/1998 | Macken et al. | 385/135 |
| 5,802,237 | A | * | 9/1998 | Pulido | 385/135 |
| 6,282,360 | B1 | | 8/2001 | Milanowski et al. | 385/135 |
| 6,418,264 | B1 | | 7/2002 | Hough et al. | 385/135 |

FOREIGN PATENT DOCUMENTS

| | | |
|---|---|---|
| EP | 0 980 012 | 2/2000 |
| EP | 1 026 530 A1 | 8/2000 |
| EP | 01305038.0 | 6/2001 |
| GB | 2 283 373 | 5/1995 |
| GB | 2 300 488 A | 11/1996 |
| GB | 2 325 531 A | 11/1998 |
| GB | 2 351 333 | 12/2000 |
| JP | 08-075970 | 3/1996 |
| JP | 10-062668 | 3/1998 |
| JP | 11-051852 | 2/1999 |
| WO | 98/53354 | 11/1998 |

OTHER PUBLICATIONS

Shinichi; "Optical Fiber Cable for Pneumatic Force Feeding" ; Patent Abstracts of Japan, of JP 10–197765 A, Jul. 31, 1998.

Griffiths et al., "Connecting Optical Fibres", U.S. patent application No. 10/170,545, filed Jun. 14, 2002, Publ. # 2002/0191942.

* cited by examiner

*Primary Examiner*—John D. Lee
(74) *Attorney, Agent, or Firm*—Finnegan, Henderson, Farabow, Garrett & Dunner, L.L.P.

(57) ABSTRACT

The present invention provides an assembly for use in connecting optical fibers. The assembly may comprise a plurality of housings for housing connections between optical fibers and a guide arrangement for guiding optical fibres into the housings. The guide arrangement may comprise a plurality of guide devices each having one inlet port for the passage of optical fibres into the guide arrangement and one outlet port for guiding optical fibers into the housing. The guide arrangement may also include one further inlet port for receiving optical fibres from another guide device and one further outlet port for guiding optical fibres to another guide device.

9 Claims, 5 Drawing Sheets

ASSEMBLY FOR USE IN CONNECTING OPTICAL FIBERS

TECHNICAL FIELD

The present invention provides an assembly for use in connecting optical fibres.

BACKGROUND

The invention is particularly, but riot exclusively, applicable to the management and routing of optical fibres at joints therefor. Typically in telecommunications, such joints are provided where it is desired to distribute optical fibres to customers. At the joint, optical fibres leading from a main network may be connected to fibres leading to individual customer locations. Hereinafter, fibres from the main network will be described as being supplied along a primary cable and fibres leading to customer locations will be described as secondary fibres. However, such joints can be provided to connect optical fibres from two primary cables thereby increasing the total length of cable.

Such joints are usually provided under ground and may be accessed via a man-hole to enable connections and routing to be made.

Optical fibres may be provided in fibre units, or bundles, which may comprise a number of fibres extending along a tube.

Hereto, optical fibre bundles enter a joint along a primary cable and are separated. Typically, eight or twelve fibres are provided in a fibre unit, or bundle, and these optical fibres are managed and routed to housings, or splice trays, where they may be connected to secondary optical fibres leading to individual customers. An example of these housings or splice trays is disclosed in the applicant's earlier application, EP-A-981775.

Each housing comprises one port into which fibres may be routed from a primary cable and a second port into which secondary fibres may be routed from customer locations. Alternatively, the housings can be used to connect fibres from two primary cables.

The present invention is particularly but not exclusively applicable to the routing of fibres from a primary cable to the housings or splice trays.

Hereto, it is known to use a guide device which guides optical fibres from an optical fibre bundle into respective housings. Such a prior art guide device is shown schematically in FIG. 9. A fibre bundle 100 containing, for example eight fibres, is separated from a primary cable (not shown) and inserted into the guide device 102 at inlet port 103. Optical fibres 104 extend out of the tube of the fibre bundle and may be separated into single or individual groups of optical fibres 106 which are distributed out of the guide device 102 at outlet ports 107 and into an associated housing 108 in a stack 110 of housings where connections to other optical fibres are made.

Generally, a primary cable contains more than one optical fibre bundle, for example, twelve bundles that may each contain eight optical fibres, making ninety-six optical fibres in total. Previously, two fibres were needed to allow communication at a customer location—a first optical fibre transmits light and a second optical fibre receives light. Therefore, the exemplary primary cable having twelve fibre bundles with eight fibres in each may be connected to a joint for distribution to a maximum of forty-eight customer locations. Each customer is allocated at least one housing from which two secondary fibres lead to the customer location. As schematically shown in FIG. 9, eight fibres 104 of an optical fibre bundle 100 are separated into groups of two fibres 106, each group leading into a housing. Therefore, twelve of the prior art guide devices shown in FIG. 9 are provided for routing the optical fibres to the respective housings, each device being associated with four housings and each fibre bundle leading to a guide device.

Recently, single fibre circuits have been introduced in which a single fibre both transmits and receives light. In this case, only a single optical fibre need be guided to each of the housings. There is some difficulty in adopting single fibre circuits with the prior art arrangement shown in FIG. 9 since each guide device is provided with only four outlet ports and eight outlet ports are required to route eight fibres from an eight fibre bundle to eight housings. In this case, it is required to separate the fibres of the fibre bundle into two groups of four fibres, using a manifold device, and route each group to a guide device 102. This is disadvantageous because these manifold devices take up space in a joint and space is limited. Also, it is relatively time consuming to separate the fibres into groups prior to introducing the fibres into the guide devices.

The situation is further complicated since optical fibre bundles are often provided with twelve optical fibres and both single and two fibre circuits may be required.

In addition to the above disadvantages it is desirable to have greater flexibility for routing fibres to selected housings which is currently not available in the prior art.

SUMMARY OF A FEW ASPECTS OF THE INVENTION

It is an object of the present invention to provide an assembly for connecting optical fibres which is flexible and which can readily accommodate single and two fibre circuits.

The present invention provides an assembly for use in connecting optical fibres, the assembly comprising a plurality of housings for housing connections between optical fibres and a guide arrangement for guiding optical fibres into said housings, said guide arrangement comprising a plurality of guide devices mounted side-by-side, each guide device having at least one inlet port for the passage of optical fibres into the guide arrangement, at least one outlet port associated with a said housing for guiding optical fibres into the associated housing, at least one further inlet port for receiving optical fibres from another one of said guide devices when positioned adjacent said guide device on one side thereof and at least one further outlet port for guiding optical fibres to another one of said guide devices when positioned adjacent said guide device on another side thereof, said guide arrangement comprising at least two guide devices.

The or each inlet port may have a substantially cylindrical portion to correspond with the shape of a tubular member containing optical fibres so that a push-fit connection can be achieved by such a tubular member in the inlet port.

Each guide device may provide a plurality of fixed tracks extending from said at least one inlet port to said at least one outlet port and to said at least one further outlet port for guiding optical fibres from the or each inlet port to said at least one outlet port and to said at least one further outlet port.

Each guide device may provide a plurality of fixed tracks extending from said at least one further inlet port to said at least one outlet port and to said at least one further outlet port for guiding optical fibres from the or each further inlet port to said at least one outlet port and to said at least one further outlet port.

Said fixed tracks may be channels and have a bend radius not less than a predetermined distance for reducing signal attenuation in optical fibres disposed therein.

The further outlet ports of one of said guide devices may be adjacent the further inlet ports of another of said guide devices for guiding optical fibres between said one and said other guide devices.

Fixed tracks may provide tracks which extend from the or each inlet port of one of said devices to the outlet ports of another of said guide devices and said tracks have a bend radius not less than a predetermined distance for reducing signal attenuation in optical fibres disposed in the tracks.

BRIEF DESCRIPTION OF THE DRAWINGS

In order that the present invention may be well understood, an embodiment thereof, which is given by way of example only will now be described with reference to the accompanying drawings, in which.

DESCRIPTION OF VARIOUS EMBODIMENTS

Figure 1:
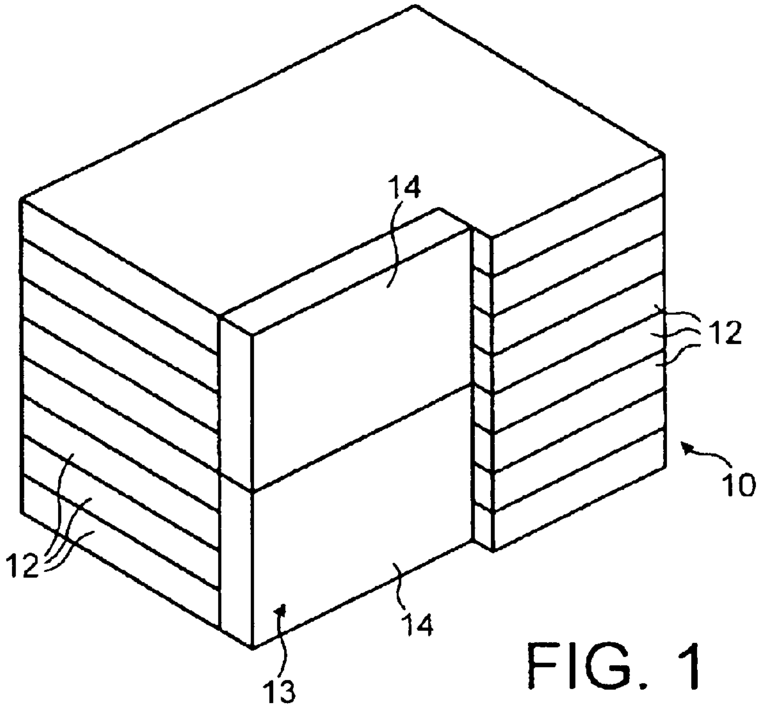
FIG. 1 is a schematic view of an assembly for use in connecting optical fibres.

Referring to FIG. 1, an assembly 10 is shown for connecting optical fibres, the assembly 10 comprising a plurality of housings 12 for housing connections between optical fibres and a guide arrangement 13 for guiding optical fibres into said housings 12. The guide arrangement 13 comprises two guide devices 14 mounted side-by-side. The housings 12 may be provided in units of four housings, each unit being supplied with a guide device 14. As shown in FIG. 1, the housings 12 and the two guide devices 14 are in a stacked arrangement with the guide devices being adjacent to one another and fitted in the assembly relative to the housings. The stack may comprise only two guide devices fitted relative to the housings and as demand increases further housings and guide devices can be added to the stack.

Figure 2:
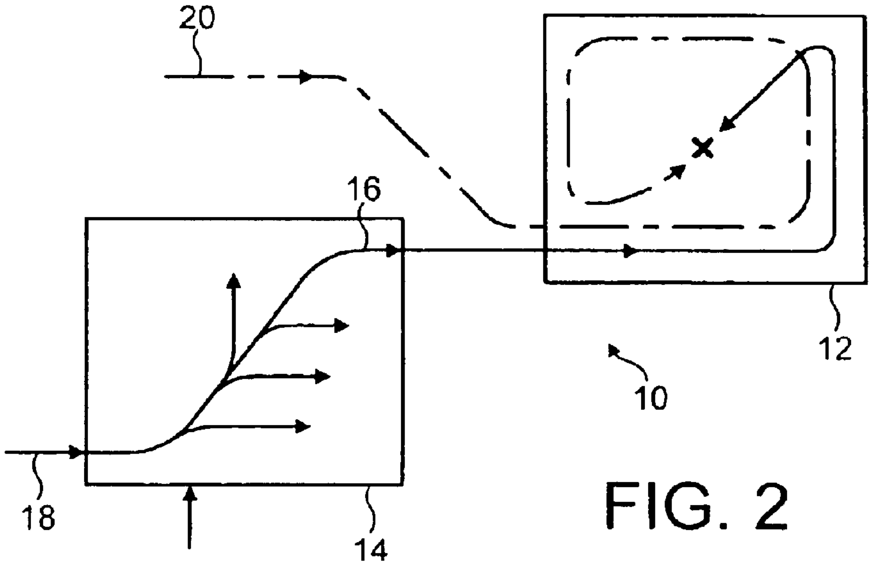
FIG. 2 is a diagram showing fibre routing in a guide device and housing.

FIG. 2 shows the routing of an optical fibre 16 of an optical fibre bundle 18 that has been separated from a primary cable and introduced to a guide device 14. Fibre 16 is guided through guide device 14 and into housing 12 where it is routed into position for splicing with fibre 20. Fibre 20 may be a secondary fibre leading to an individual customer location or may be a fibre of a fibre bundle from another primary cable. Fibres 16 and 20 are spliced together at position X in housing 12.

Figure 3:
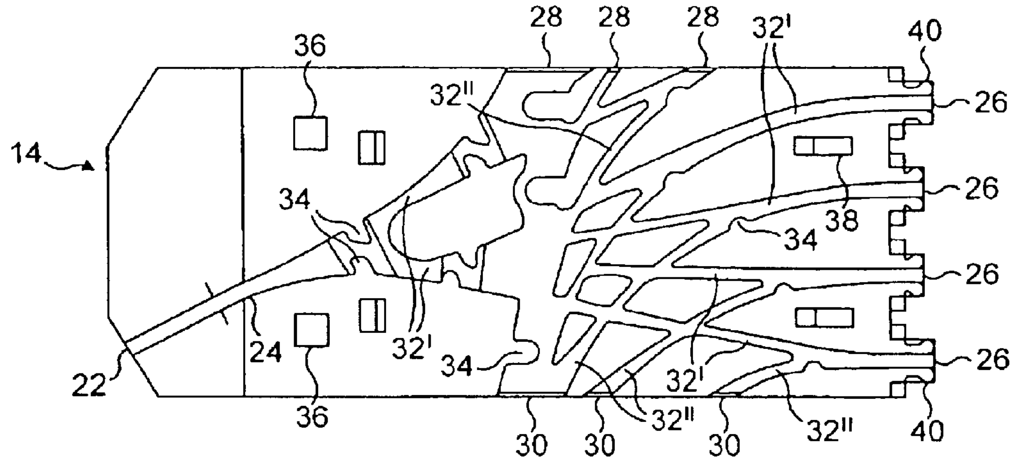
FIG. 3 is a detailed plan view of the guide device.
Figure 4:
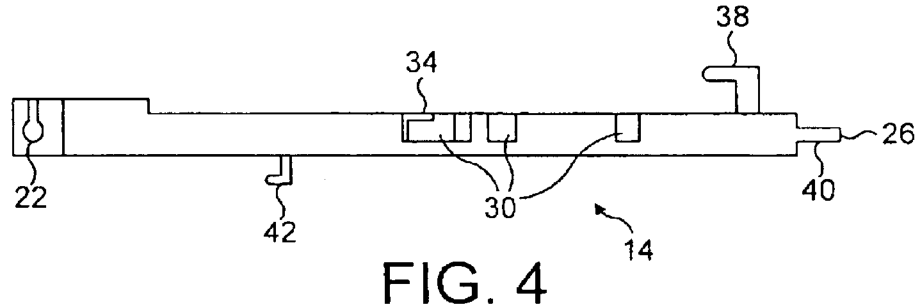
FIG. 4 is a detailed elevational view of the guide device.

Referring to FIGS. 3 and 4, the guide device 14 is shown in more detail and provides an inlet port 22 into which an end portion 23' of a tubular member 23 (FIG. 5) containing a fibre bundle 18 can be inserted through a substantially circular aperture for the passage of optical fibres into the guide arrangement. Inlet port 22 has a substantially cylindrical portion to correspond with the shape of the end portion 23' of the tubular member 23 so that it can be push-fitted, or plugged, into the inlet port 22. Only a central section of the end portion 23' shows through a longitudinal slit in the face of the guide device 14. Inlet port 22 also comprises a flanged portion against which the end portion 23' of the tubular member 23 abuts when push-fitted into the inlet port 22 to limit travel of the tubular member into the inlet port 22. The flanged portion provides a slit through which optical fibres 16 extend from the tubular member 23 and into the guide device 14 along portion 24. Although the illustrated guide device is provided with only one inlet port 22, more than one such port may be provided to permit insertion of a fibre bundle 18 from more than one direction.

Outlet ports 26 are provided and each are associated with a respective housing 12 (not shown in FIGS. 3 and 4) for guiding optical fibres into the respective housing 12.

Figure 6:
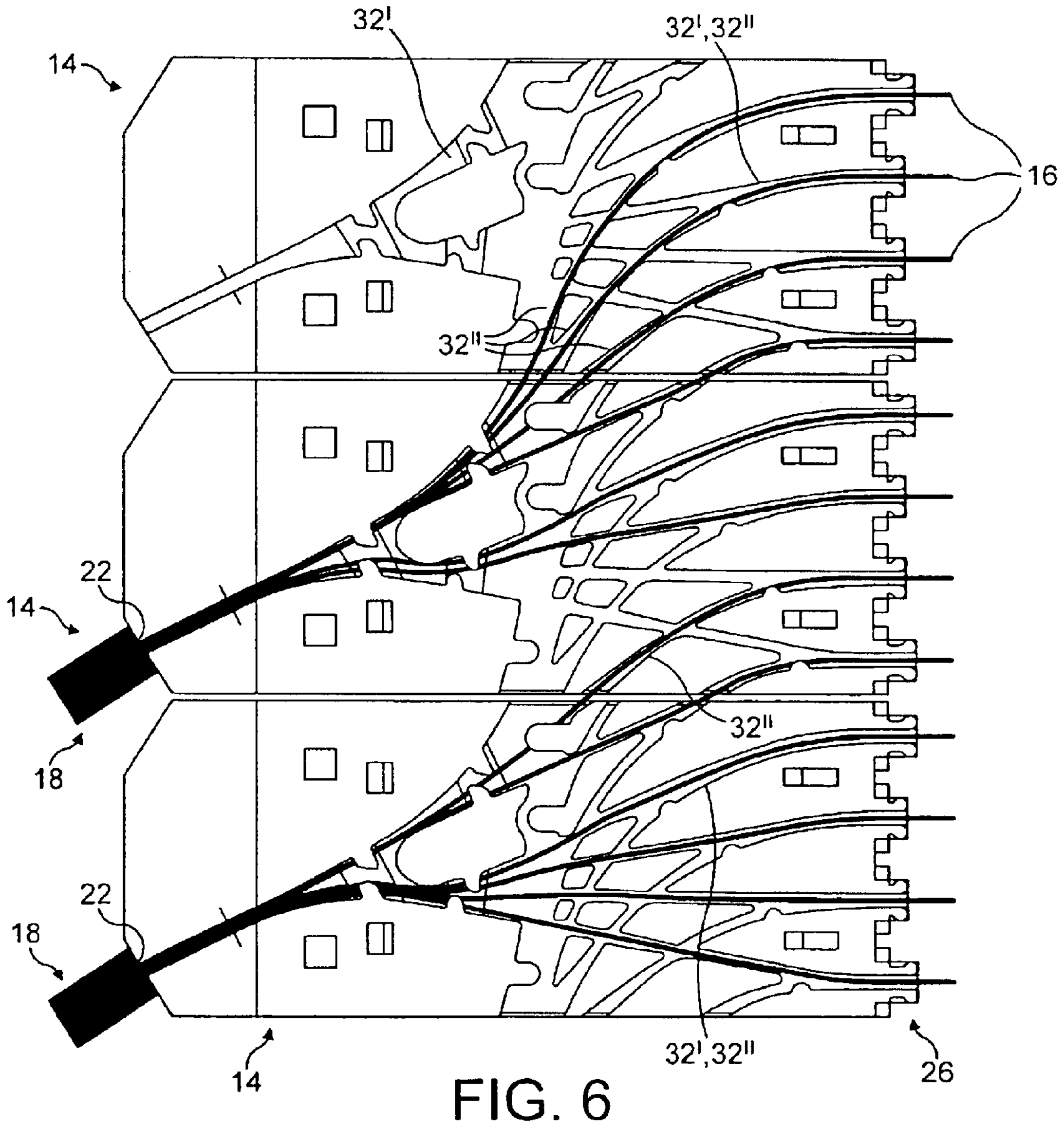
FIG. 6 is a detailed plan view of two of the guide devices guiding optical fibres from a twelve fibre bundle on a two fibre per housing basis.
Figure 7:
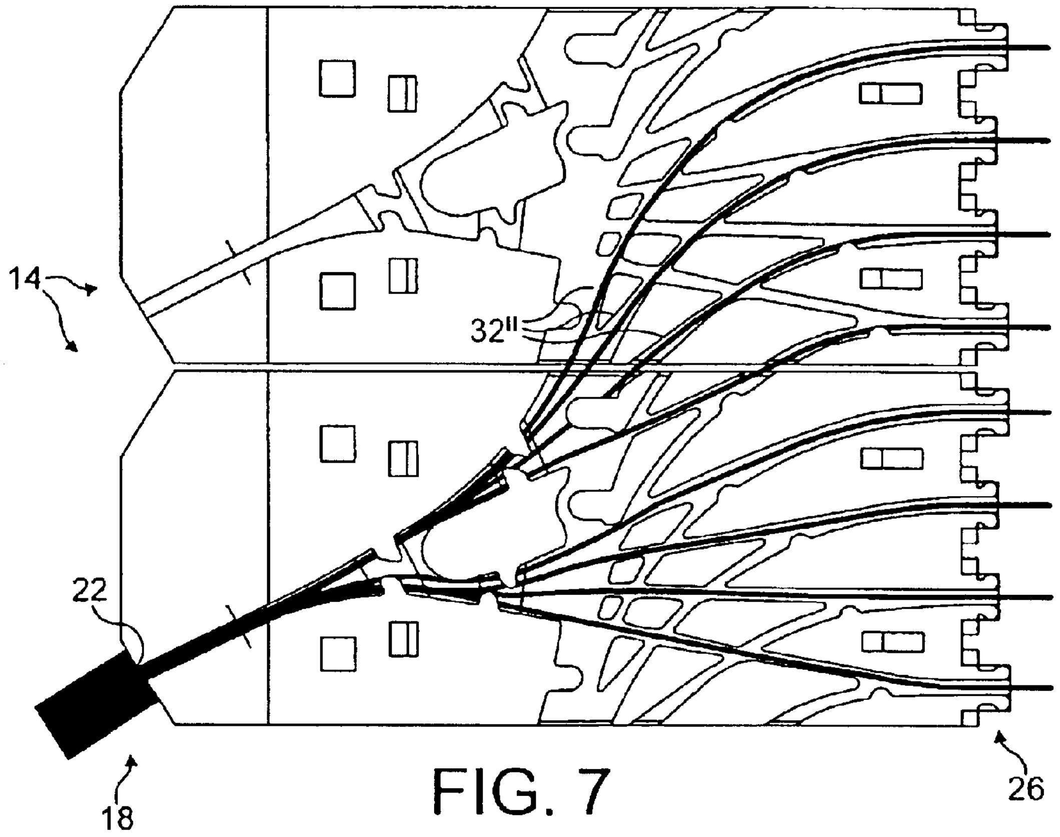
FIG. 7 is a detailed plan view of two of the guide devices guiding optical fibres from an eight fibre bundle on a one fibre per housing basis.
Figure 9:
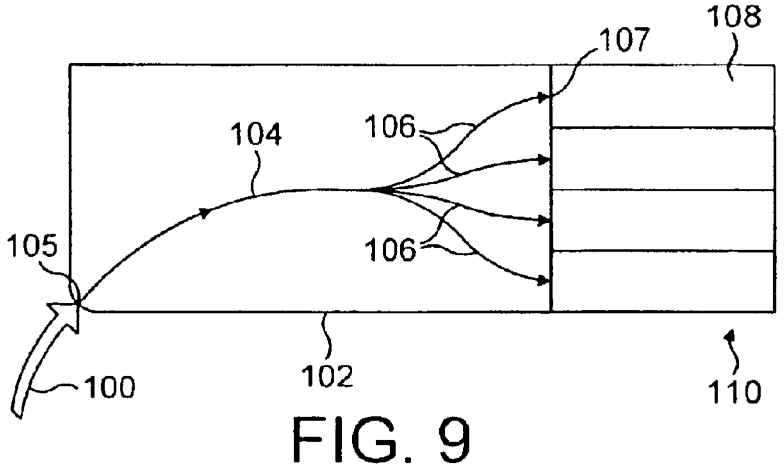
FIG. 9 is a schematic view of a prior art assembly for use in connecting optical fibres.
Figure 8:
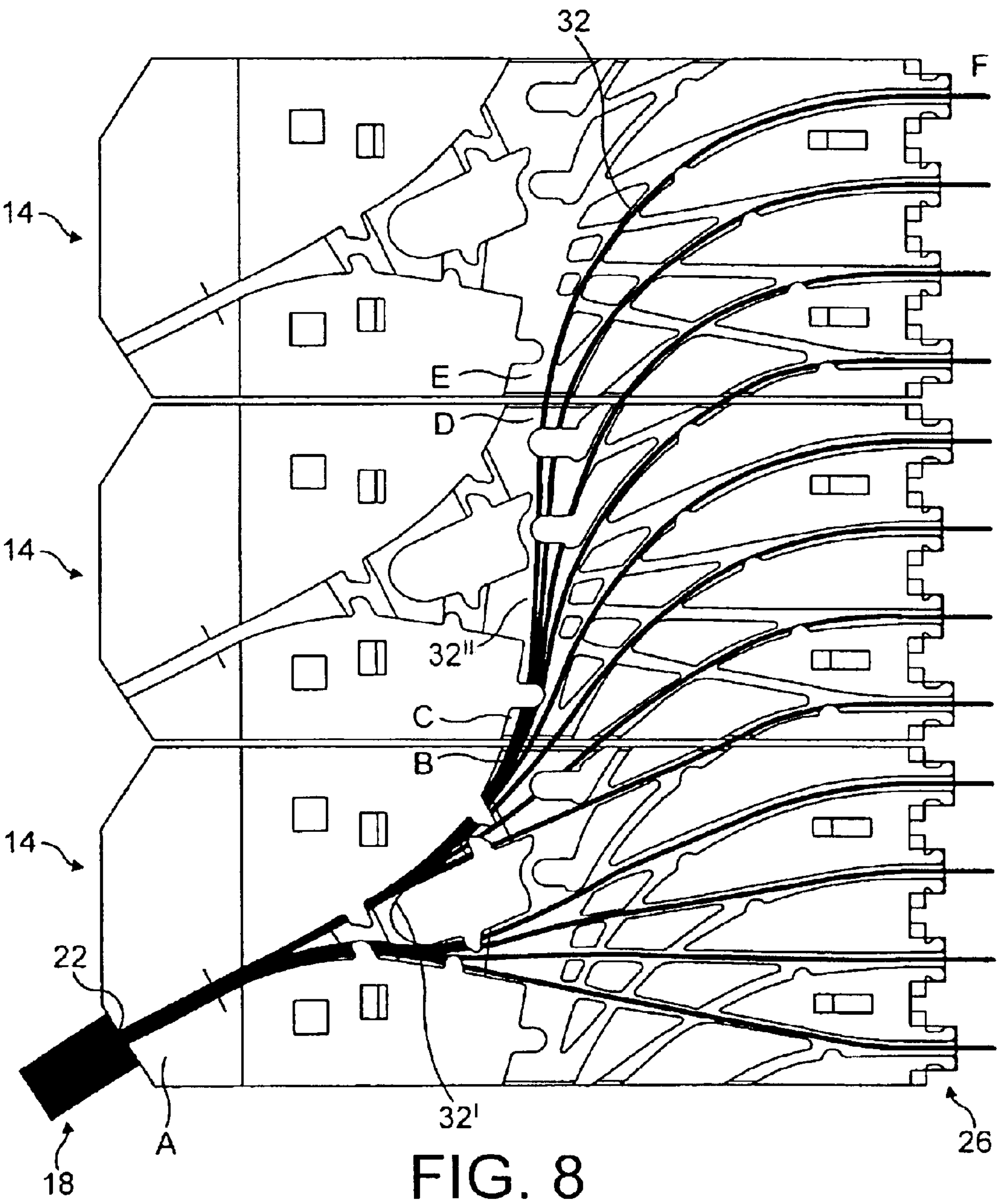
FIG. 8 is a detailed plan view of one of the guide devices guiding optical fibres from a twelve fibre bundle on a one fibre per housing basis.

The guide device 14 comprises further ports including outlet ports 28 and inlet ports 30. Further outlet ports 28 are provided for guiding optical fibres to an adjacent like guide device and further inlet ports 30 are provided for receiving optical fibres from an adjacent like guide device. Respective further outlet and inlet ports 28, 30 of adjacent guide devices are arranged to be aligned so that optical fibres can readily be guided from the further outlet ports 28 of one guide device to the further inlet ports 30 of the adjacent guide device, as is shown in FIGS. 6 to 8 described below.

The guide device 14 comprises a plurality of fixed tracks 32' and 32". A first plurality of fixed tracks 32' extend from inlet port 22 to outlet ports 26 and to further outlet ports 28 for guiding optical fibres from the inlet port 22 to the outlet ports 26 and to the further outlet ports 28. Also, a second plurality of fixed tracks 32" extend from further inlet ports 30 to outlet ports 26 and to further outlet ports 28 for guiding optical fibres from the further inlet port 30 to the outlet ports 26 and to the further outlet ports 28. Over a portion of their lengths, fixed tracks 32' and fixed tracks 32" may be coextensive and over such a portion can guide fibres from either or both of the inlet port 22 and the further inlet ports 30. The fixed tracks illustrated are in the form of channels so that fibres can readily be pressed laterally into the fixed tracks. However, the fixed tracks may alternatively be bores through which optical fibres may be threaded. The illustrated channels have retaining tabs 34 for retaining optical fibres when introduced to the channels. A transparent cover (not shown) may also be fitted to the guide device for preventing dislodgement of the optical fibres once they are pressed into the channels. The cover is engageable with apertures 36 and barbs 38 on the guide device 14.

The fixed tracks 32', 32" have a radius of curvature, or bend radius, no less than a predetermined distance for reducing signal attenuation of optical fibres disposed in the fixed tracks 32', 32". The minimum radius of curvature is preferably 30 mm. The fixed tracks leading to the further outlet ports 28 of one guide device are aligned with and of a similar radius of curvature to the fixed tracks leading from the further inlet ports 30 of an adjacent like guide device. In this way, fixed tracks 32', 32" provide tracks which extend from the or each inlet port 22 of one guide device 14 to the outlet ports 26 of another guide device 14 and said tracks have a minimum bend radius for reducing signal attenuation in optical fibres disposed therein.

The guide device 14 is fitted to the housings by use of spigots 40 and barbs 42 which engage with optical fibre inlet ports (not shown) and recesses (not shown), respectively, provided in the housings 12. However, any suitable means of fitting the guide device 12 to the housings 14 may be provided as required.

FIGS. 5 to 8 show exemplary routing arrangements of optical fibres using one or more guide devices 14. After passing through the outlet ports 26 of the illustrated guide devices 14, the optical fibres 16 are introduced into associated housings (not shown).

Figure 5:
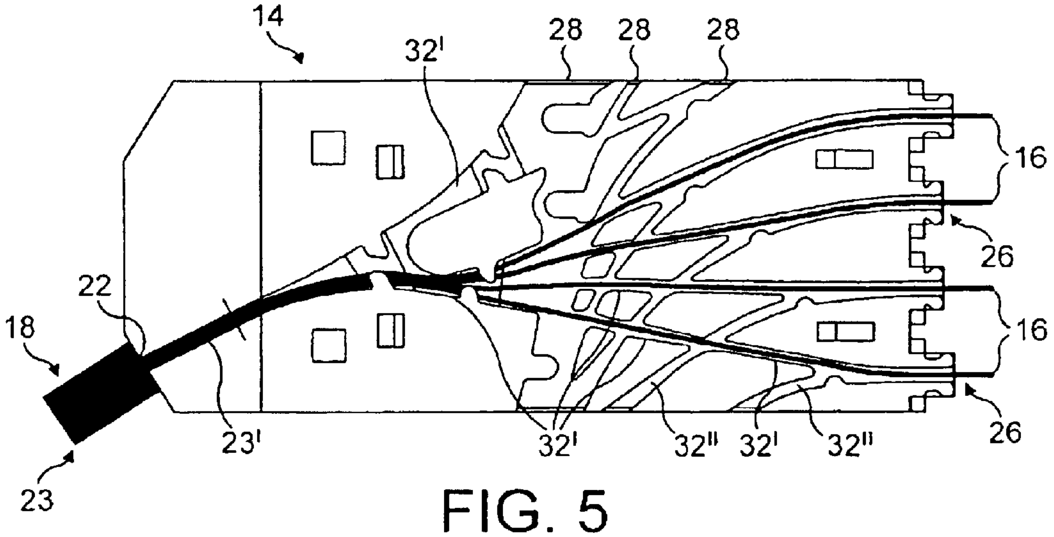
FIG. 5 is a detailed plan view of one of the guide devices guiding optical fibres from an eight fibre bundle on a two fibre per housing basis.

FIG. 5 shows a guide device 14 with an optical fibre bundle 18 having eight fibres 16 guided on a two fibre per housing basis. The eight fibres are introduced to the guide device at the inlet port 22. Each group of two fibres follows a fixed track 32' to a respective outlet port 26. Although the further ports 28, 30 and fixed tracks 32" are not used in this arrangement, they are available for guiding fibres to and receiving fibres from adjacent guide devices as required.

FIG. 6 shows how fibre bundles 18 having twelve fibres 16 are routed on a two fibre per housing basis. Two fibre bundles 18 with twelve fibres in each are introduced at the inlet ports 22 of two of three guide devices 14. The fibres in the two bundles are separated into twelve groups of two fibres, each group being guided along a respective fixed track 32', 32" to an outlet port 26. In this arrangement, some fibres 16 introduced at the inlet port 22 of a first guide device 14, are guided along fixed tracks 32' to a further outlet port 28 of the first guide device 14 and to the further inlet port 30 of an adjacent guide device 14 from which they are guided to an outlet port 26 of the adjacent guide device 14 along fixed tracks 32". In other words, these optical fibres 16 are guided along tracks (including fixed tracks 32' and fixed tracks 32") which extend from the inlet port 22 of one device 14 to the outlet ports 26 of another of the guide devices 14 and these tracks have a minimum bend radius for preventing signal attenuation of the optical fibres disposed therein.

FIGS. 7 and 8 show, respectively, how optical fibre bundles 18 having eight and twelve fibres are routed on a one fibre per housing basis. In both arrangements, fibres introduced into a first guide device 14 are guided to outlet ports 26 of both the first and an adjacent guide device 14. In the FIG. 8 arrangement, optical fibres 16 are also guided to the outlet ports 26 of a third guide device 14 spaced from the first guide device 14. For example, one fibre is guided along a track (including fixed tracks 32' and fixed tracks 32") which extends sequentially through an inlet port (A) and a further outlet port (B) of a first device 14, through a further inlet port (C) and a further outlet port (D) of a second device 14, and through a further inlet port (E) and through an outlet port (F) of a third device 14.

Four specific routing arrangements have been described with reference to FIGS. 5 to 8, however other arrangements are possible. For instance, a stack of forty-eight housings may be provided with twelve guide devices and fibre may be guided from a lowest guide device to an outlet port of the highest guide device. It is the flexibility of the illustrated guide devices which is advantageous.

What is claimed is:

1. An assembly for use in connecting optical fibres, the assembly comprising a plurality of housings for housing connections between optical fibres and a guide arrangement for guiding optical fibres into said housings, said guide arrangement comprising a plurality of guide devices mounted side-by-side, each guide device having at least one inlet port for the passage of optical fibres into the guide arrangement, a plurality of outlet ports associated with respective said housings for guiding optical fibres into the associated housing, a plurality of further inlet ports for receiving optical fibres from another one of said guide devices when positioned adjacent said guide device on one side thereof and a plurality of further outlet ports for guiding optical fibres to respective said further inlet ports of another one of said guide devices when positioned adjacent said guide device on another side thereof, said guide arrangement comprising at least two guide devices.

2. An assembly as claimed in claim 1, wherein the or each inlet port has a substantially cylindrical portion to correspond with the shape of a tubular member containing optical fibres so that a push-fit connection can be achieved by such a tubular member in the inlet port.

3. An assembly as claimed in claim 1, wherein each guide device provides a plurality of fixed tracks extending from said at least one inlet port to respective said outlet ports and to respective said further outlet ports for guiding optical fibres from the or each inlet port to respective said outlet ports and to respective said further outlet ports.

4. An assembly as claimed in claim 1, wherein each guide device provides a plurality of fixed tracks extending from said further inlet ports to respective said outlet ports and to respective said further outlet ports for guiding optical fibres from the further inlet ports to respective said outlet ports and to respective said further outlet ports.

5. An assembly as claimed in claim 3, wherein said fixed tracks are channels and have a bend radius not less than a predetermined distance for reducing signal attenuation in optical fibres disposed therein.

6. An assembly as claimed in claim 1, wherein the further outlet ports of one of said guide devices are adjacent the further inlet ports of another of said guide devices to assist in guidance of optical fibres between said further outlet parts of said one guide device and the further inlet ports of said another guide devices.

7. An assembly as claimed in claim 1, wherein fixed tracks provide tracks which extend from the or each inlet port of one of said devices to the outlet ports of another of said guide devices and said tracks have a bend radius not less than a predetermined distance for reducing signal attenuation in optical fibres disposed in the tracks.

8. An assembly as claimed in claim 5, wherein said fixed tracks have a bend radius of not less than 30 mm.

9. An assembly as claimed in claim 7, wherein said tracks have a bend radius of not less than 30 mm.

* * * * *

UNITED STATES PATENT AND TRADEMARK OFFICE

CERTIFICATE OF CORRECTION

PATENT NO. : 6,764,220 B2
DATED : July 20, 2004
INVENTOR(S) : Ian James Griffiths et al.

It is certified that error appears in the above-identified patent and that said Letters Patent is hereby corrected as shown below:

Column 6,
Line 43, “parts” should read -- ports --.

Signed and Sealed this

Thirtieth Day of November, 2004

JON W. DUDAS
*Director of the United States Patent and Trademark Office*